Fuller & Horre,
Reciprocating Churn.
N° 44,523. Patented Oct. 4, 1864.
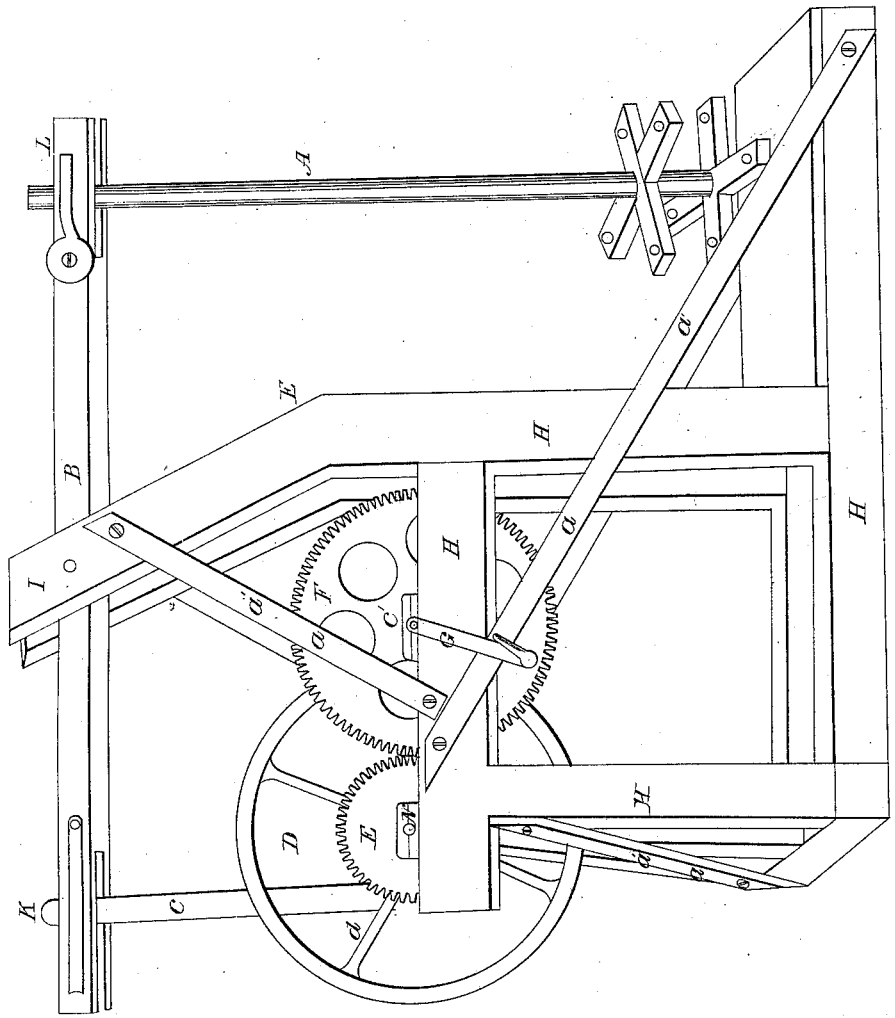
Witnesses: Inventor:
Aaron Fuller

UNITED STATES PATENT OFFICE.

AARON FULLER, OF AMSTERDAM, AND WM. H. HOWE, OF PORT JACKSON, NEW YORK.

CHURN-POWER.

Specification forming part of Letters Patent No. 44,523, dated October 4, 1864.

*To all whom it may concern:*

Be it known that we, AARON FULLER, of Amsterdam, and WILLIAM H. HOWE, of Port Jackson, Montgomery county, in the State of New York, have invented a new and Improved Mode for Constructing Churn-Powers; and we do hereby declare the following to be a clear, full, and exact description thereof, reference being had to the accompanying drawings.

Like letters represent corresponding parts.

First, we construct a wooden frame, represented by H H H H in the drawings, having two upright posts, one on each side of frame, represented by E, which may be bent to the left for the purpose of preserving the center of gravity. Having constructed the frame we lash on the braces $a\ a'$ on each side of the frame H and across the back end thereof for the purpose of stays. We then provide a balance or drive wheel, D, made of metal, about two feet in diameter. This wheel is suspended through its center by means of a pivot or bolt acting as an axle, which is passed through the metal box at N. We then provide a cog-wheel, E, six inches in diameter, made of metal, which is also pivoted through its center by the same bolt that pivots D at N. We next provide another cog-wheel, F, twelve inches in diameter, made of metal, which is pivoted through its center by a bolt which acts as an axle, through another metal box at C'. The cogs in this wheel F match and set between the cogs on wheel E. The front end of the pivot passing through the metal box at C' protrudes sufficiently to receive a crank or pulley, to which the power is applied for turning or driving the gearing.

On shaft or arm $d$ of wheel D and at about one-third from the center of wheel D we provide a pitman, to which we attach the pitman-shaft, C, made of wood and about two feet in length. In the upper end of the pitman-shaft C we make a slot or groove for the purpose of receiving the working-lever B. This lever is pivoted to the upper end of pitman-shaft at K, which pivot allows the lever and pitman-shaft to vibrate. The working-lever B is four feet long and is made of wood for the purpose of securing lightness to the frame. This lever is pivoted and turns upon a bolt, I, through the groove in the upper part of the posts E at about the center of such working-lever. At the end of the working-lever B we make a slot or groove at L, which receives the shaft A of a common churn-dash. By means of a counterbalance on the arm of the wheel D opposite to the pitman-arm $d$ we preserve or counteract the force of the pitman-shaft.

By turning crank G the cog-wheel F revolves, the cogs of which press against cogs in wheel E and thus turn both wheel E and drive or balance wheel D. By the disparity of the size of the cog-wheels we secure two revolutions of wheels D and E to one turn of crank G.

The arrangement of the wheels, pitman-shaft, and working-lever, as described, gives an upward and downward motion to the perpendicular dash to a churn.

Having thus described our invention, the following is what we claim as new therein and desire to secure by Letters Patent:

In combination with the frame H, braces $a\ a'$, cog-wheels E F, fly-wheel D, pitman C, working-lever B, and dash A, the posts E I, inclined inward from one side of the frame and affording a bearing for the working-lever B in the center of the said lever and over the center of the machine when all the parts are arranged in the manner and for the purposes herein specified.

AARON FULLER,
WM. H. HOWE.

Witnesses:
C. P. WINEGAR,
S. A. LEWIS.